United States Patent
Lewites

(10) Patent No.: US 8,261,053 B2
(45) Date of Patent: *Sep. 4, 2012

(54) METHOD AND APPARATUS FOR MAINTAINING A PARTITION WHEN BOOTING ANOTHER PARTITION

(75) Inventor: Saul Lewites, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/778,091

(22) Filed: May 11, 2010

(65) Prior Publication Data
US 2010/0325408 A1 Dec. 23, 2010

Related U.S. Application Data

(63) Continuation of application No. 11/273,817, filed on Nov. 14, 2005, now Pat. No. 7,716,465.

(51) Int. Cl.
*G06F 15/177* (2006.01)

(52) U.S. Cl. .............................................. 713/2; 710/48
(58) Field of Classification Search .......... 713/2; 710/48
See application file for complete search history.

(56) References Cited

U.S. PATENT DOCUMENTS
5,524,209 A * 6/1996 Parker et al. .................... 714/36
* cited by examiner

*Primary Examiner* — Albert Wang
(74) *Attorney, Agent, or Firm* — Caven & Aghevli LLC

(57) ABSTRACT

In a processing system with a main partition and a sequestered partition, the main partition sends an interrupt to the sequestered partition before calling an operating system (OS) boot loader for the main partition. The sequestered partition may then enter an interrupt handler. After the sequestered partition enters the interrupt handler, an address line of the processing system may be disabled, and the OS boot loader for the non-sequestered partition may be called. The sequestered partition may then determine whether the address line has been re-enabled. The sequestered partition may remain in the interrupt handler until after the address line has been re-enabled. Other embodiments are described and claimed.

17 Claims, 4 Drawing Sheets

METHOD AND APPARATUS FOR MAINTAINING A PARTITION WHEN BOOTING ANOTHER PARTITION

REFERENCE TO RELATED APPLICATIONS

This application is a continuation of and claims priority from U.S. patent application Ser. No. 11/273,817 filed Nov. 14, 2005, now U.S. Pat. No. 7,716,465 and entitled "METHOD AND APPARATUS FOR MAINTAINING A PARTITION WHEN BOOTING ANOTHER PARTITION WHILE AN ADDRESS LINE IS DISABLED" which is incorporated herein by reference for all purposes.

FIELD OF THE INVENTION

The present disclosure relates generally to the field of data processing, and more particularly to methods and related apparatus for supporting multiple partitions in a processing system.

BACKGROUND

In a typical legacy data processing system, firmware provides the machine instructions that control the system when the system is being powered up or has been reset, but before an operating system (OS) is booted. That is, the firmware controls the pre-OS or pre-boot operations. Firmware may also control certain operations after the OS has been loaded, such as operations for handling certain hardware events and/or system interrupts. The firmware may handle pre-boot and post-boot operations through a set of routines referred to collectively as a basic input/output system (BIOS). The BIOS thus provides the interface between the hardware components of the system and software components such as the OS.

For purposes of this disclosure, the term "firmware" is used to refer to software that may execute in a processing system before the processing system has booted to an OS, software that may provide runtime services that allow the OS or other components to interact with the processing system hardware, and similar types of software components. Traditionally, firmware was typically stored in non-volatile memory. In more recent years, however, processing systems have been developed that store firmware in, or obtain firmware from, other types of storage devices.

In addition, not long ago, a new model for an interface between platform firmware and higher-level software such as operating systems was announced. That model is known as the Extensible Firmware Interface (EFI). Version 1.10 of the EFI specification, dated Dec. 1, 2002, may be obtained from www.intel.com/technology/efi/main_specification.htm. The EFI specification defines a set of standard interfaces and structures to be provided by low-level platform firmware. Those interfaces and structures may be used for tasks such as loading additional firmware, running pre-boot applications, booting the OS, and providing runtime services after an OS has been booted.

A BIOS that was created before promulgation of, or without regard to, the EFI specification may be called a legacy BIOS. Similarly, an OS that is designed to work with a legacy BIOS may be called a legacy OS or a non-EFI-compliant OS. For example, the Windows XP® OS may be considered a legacy OS. By contrast, an OS that is able to work with an EFI-compliant BIOS may be called an EFI-compliant OS.

For purposes of this disclosure, depending upon the particular implementation under consideration, the term "processing unit" may denote individual central processing units (CPUs) within a processing system, processing cores within a CPU, logical processing units such as hyper-threads (HTs), or any similar processing resource or collection of resources to operate cooperatively as a unit. In a system where multiple processing units exist, the operating system (OS) normally owns all of the processing units.

However, in some processing systems, it is possible to hide one or more of the processing units from the OS by modifying the advanced configuration and power interface (ACPI) tables produced by the BIOS. In some systems it is also possible to hide one or more portions of random access memory (RAM) from the OS. Additionally, in some systems, several peripheral and integrated devices can be hidden by writing bit masks to registers in the system's input/output (I/O) controller hub (ICH). These techniques may be used to create two (or more) execution environments within a single processing system. The OS may run in one of those environments, referred to as the "main partition." The other environment, known as the "sequestered partition," may not be visible to the OS. The sequestered partition can be used for a wide variety of applications, such as I/O offloading, platform manageability, fault prediction, etc.

In a typical processing system, the BIOS starts booting the OS by calling a program known as the OS boot loader. For historical reasons, the OS boot loader for a non-EFI-compliant OS typically expects or requires the BIOS to switch the processor to real mode and disable address line #21 before invoking the loader. Since the pins on a device such as a keyboard controller may be numbered starting with 0, address line #21 may actually be couple to a pin labeled "A20."

In a processing system with multiple partitions, if the main partition runs on CPU1 and the sequestered partition runs on CPU2, switching CPU1 to real mode may not affect the sequestered partition, as CPUs may be able to switch modes independently. However, the A20 mask output pin of the keyboard controller may be connected to all CPUs. Consequently, activating that pin may preclude all CPUs from accessing odd megabytes (MBs) of memory. Instead, if the A20 pin is active, all references to addresses within an odd MB of memory may actually get mapped over a corresponding address within even MB of memory. Consequently, if the sequestered partition were to execute code or access data from an odd MB of memory when the A20 pin is active or address line #21 is disabled, the processing system may map the memory reference to an incorrect location, which may ultimately result in a system errors or a system crash.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

This disclosure describes one or more example embodiments of a system and method for preventing a sequestered partition from failing when a main partition boots a non-EFI-compliant OS. One or more disclosed embodiments achieve this functionality by taking advantage of the fact that programs for handling signals such as system management interrupts (SMIs) reside in the first megabyte (MB) of memory. In particular, one or more disclosed embodiments reduce or eliminate the potential for a failure by forcing the sequestered partition to remain in its SMI handler until the main partition re-enables address line #21.

Figure 1:
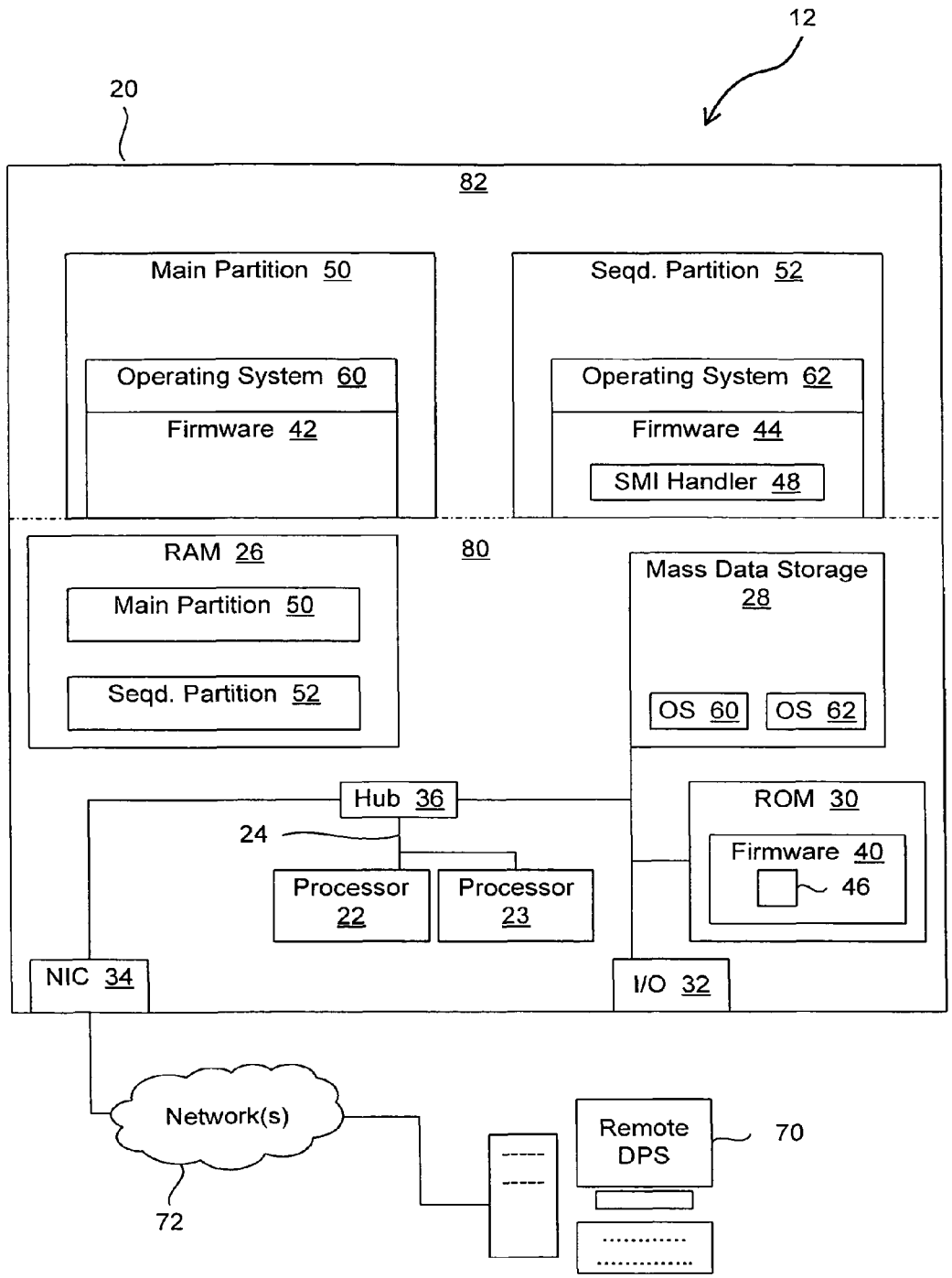
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or CPUs 22-23 communicatively coupled, directly or indirectly, to various other components via one or more system buses 24 or other communication pathways or mediums. One or more of CPUs 22-23 may include one or more processing cores, and one or more of the processing cores may support two or more threads to execute simultaneously, such as HTs.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processors 22-23 may be communicatively coupled to one or more volatile or non-volatile data storage devices, such as RAM 26, read-only memory (ROM) 28, mass storage devices 30 such as integrated drive electronics (IDE) or small computer system interface (SCSI) hard drives, and/or other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processors 22-23 may also be communicatively coupled to additional components, such as video controllers, SCSI controllers, network controllers, universal serial bus (USB) controllers, I/O ports 32, input devices such as a keyboard, a mouse, a camera, etc. Processing system 20 may also include one or more bridges or hubs 36, such as a memory controller hub, an I/O controller hub, a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as embedded controllers, using components such as programmable or non-programmable logic devices or arrays, application-specific integrated circuits (ASICs), embedded computers, smart cards, and the like.

The invention may be described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, methods, modules, drivers, subprograms, processes, and other types of software components.

For instance, data storage device 30 and/or RAM 26 may include various sets of instructions which, when executed, perform various operations. Such sets of instructions may be referred to in general as software.

In the example embodiment, processing system 20 uses techniques such as those described above to create two distinct partitions: main partition 50 and sequestered partition 52. In alternative embodiments, a processing system may have more than one main partition and/or more than one sequestered partition. As illustrated in FIG. 1, in the example embodiment, the programs or software components 82 may include a distinct instance of firmware 40 for each partition. Each partition may also receive its own OS and its own applications. For instance, in the example embodiment, each partition receives some or all of the firmware code 40 from ROM 30. In particular, processing system 20 loads one instance of firmware 40 (i.e., firmware 42) into main partition 50, and another instance (i.e., firmware 44) into sequestered partition 52. The OS 60 for main partition 50 may be the same as, or different from, the OS 62 for sequestered partition 52. In the example embodiment, firmware 40 includes an SMI handler 46, which gets instantiated in firmware 44 for sequestered partition 52 as SMI handler 48.

Figure 2:
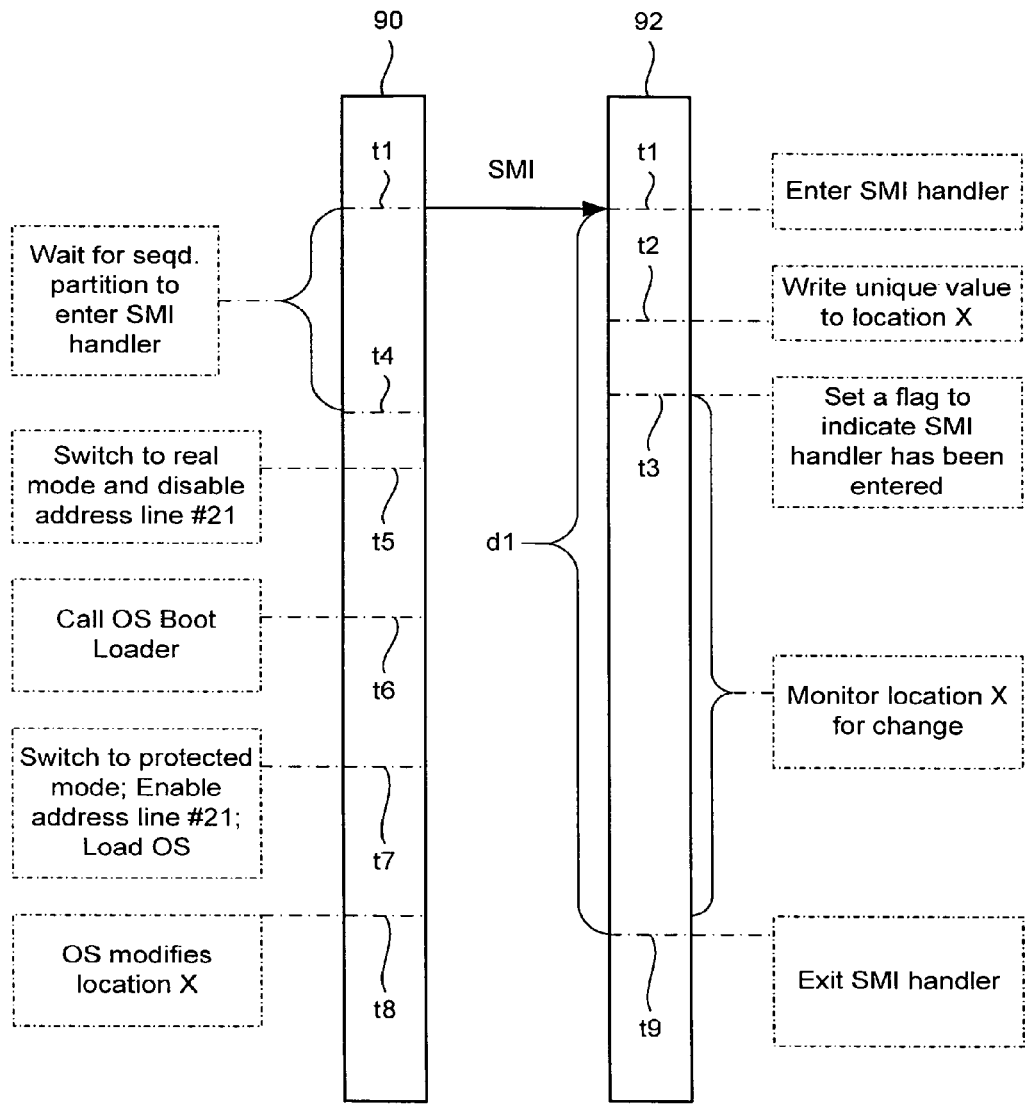
FIG. 2 is a block diagram depicting example timelines for certain operations or events according to an example embodiment of the present invention.

FIG. 2 is a block diagram depicting example timelines for certain operations or events according to an example embodiment of the present invention. In particular, timeline 90 depicts a non-exhaustive sequence of events for main partition 50, while timeline 92 depicts a corresponding, non-exhaustive sequence of events for sequestered partition 52. The illustrated events and operations pertain to an example sequence of steps for safely booting a non-EFI-compliant OS, such as OS 60, on main partition 50.

The block diagram of FIG. 1 illustrates OS 60 executing in main partition 50 and OS 62 executing in sequestered partition 52. The timelines in FIG. 2, however, begin before main partition 50 has booted to OS 60, and either before or after sequestered partition 52 has booted to OS 62. As indicated at time t1, in preparation for calling the OS boot loader for main partition 50, firmware 42 sends an SMI to sequestered partition 52. For example, firmware 42 may send a directed SMI such as an interprocessor interrupt (IPI) to the advanced programmable interface controller (APIC) identifier (ID) of the processor running the sequestered partition. Main partition 50 may then wait for an indication that sequestered partition 52 has actually entered SMI handler 48. For example, as indicated at time t3, SMI handler 48 may set a flag that can be read by main partition 50, to indicate that sequestered partition 52 has entered its SMI handler. Such a flag may reside in RAM 26, a chipset register, flash, or any other data storage component in the platform that can be written to by sequestered partition 52 and read by main partition 50.

However, as indicated at time t2, before sequestered partition 52 indicates that it has entered SMI handler 48, SMI handler 48 may write a predetermined value to a predetermined location in memory. Specifically, in one embodiment, sequestered partition 52 writes the predetermined value to a location known to be modified by the OS of main partition 50 when main partition 50 boots to its OS. For instance, sequestered partition 52 may write the predetermined value 0 to the location 0×100000 (1 MB). For purposes of this disclosure, the term "location X" may be used for convenience to identify the location that sequestered partition 52 will write to and then monitor to determine whether main partition 50 has enabled address line #21.

As indicated at time t4, once main partition 50 detects that sequestered partition 52 has entered its SMI handler, main partition 50 may stop waiting, and may then switch its supporting processor or processing unit to real mode and disable address line #21. Meanwhile, as indicated between times t3 and t9, sequestered partition 52 may monitor the location it wrote to at time t2 (i.e., location X), to determine whether OS 60 has modified the data at that location.

After switching to real mode and disabling address line #21, firmware 42 may call the OS boot loader for main partition 50, as indicated at time t6. The OS boot loader may then switch the processing unit for main partition 50 to protected mode, re-enable address line #21, and load OS 60 into main partition 50 as indicated at time t7. As indicated at time t8, once main partition 50 has started to load OS 60, OS 60 may modify the data at location X. As indicated at time t9, once SMI handler 48 detects that the data at location X has been modified, sequestered partition 52 may exit SMI handler 48. Thus, as indicated by duration d1, sequestered partition 52 will have remained in SMI handler 48 from the time it receives the SMI from main partition 50 until after it determines that main partition 50 has enabled address line #21. In this context, the term "determine" means that the SMI handler comes to a decision by investigation, reasoning, calculation, or discovery. For instance, an SMI handler may determine that address line #21 has been enabled based on discoveries pertaining to related aspects of the processing system, such as a discovery that data at location X has changed, or a discovery that the OS in the main partition is executing in protected mode.

Processing system 20 may use operations such as those described above to prevent sequestered partition 52 from accessing memory locations or addresses that may be mapped incorrectly due to a disabled the address line. Once main partition 50 has modified location X and sequestered partition 52 has exited its SMI handler, processing system 20 may resume normal execution.

Figure 3:
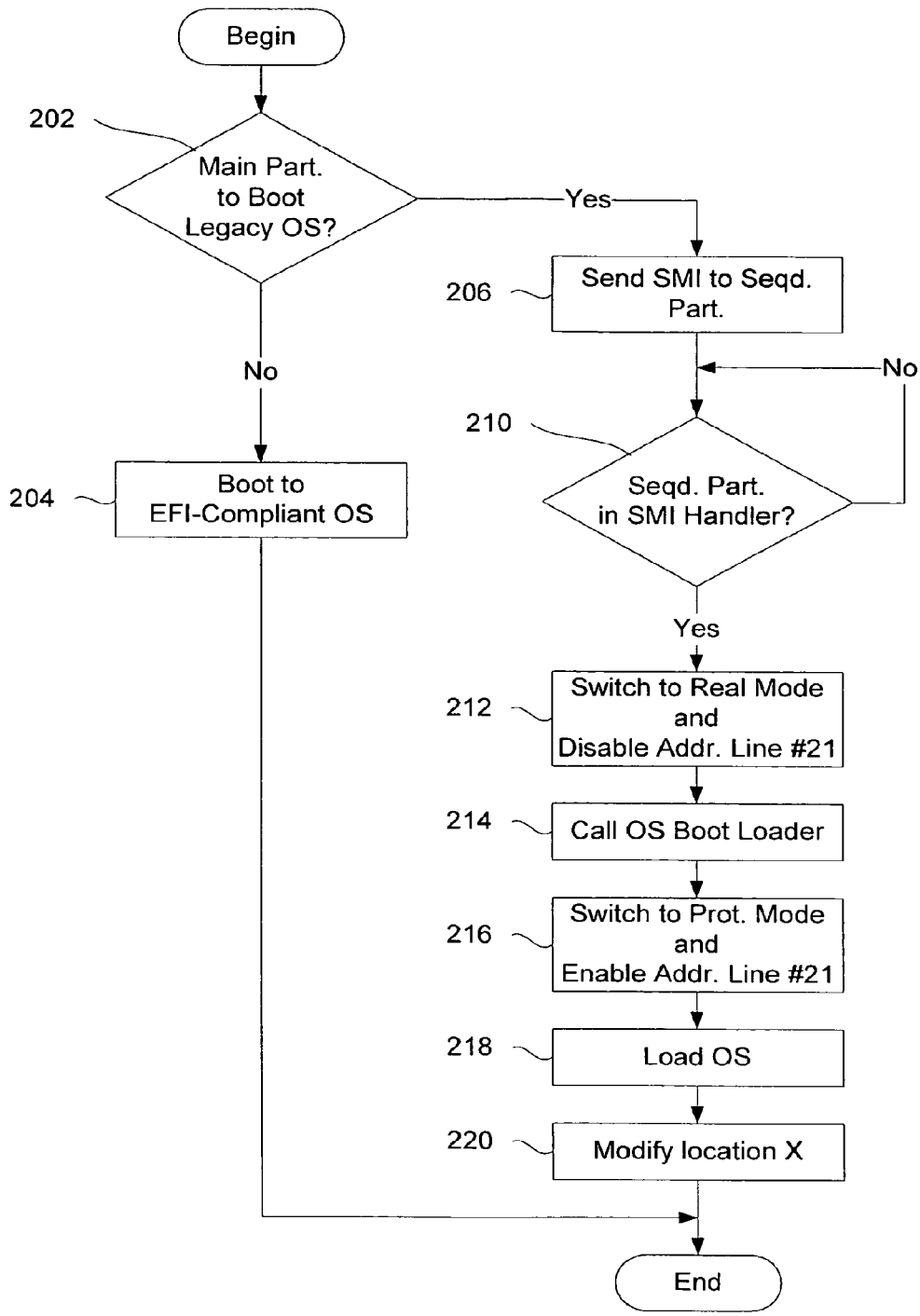
FIGS. 3 & 4 are flowcharts depicting various aspects of a process for maintaining a sequestered partition when booting a main partition, according to an example embodiment of the present invention.
Figure 4:
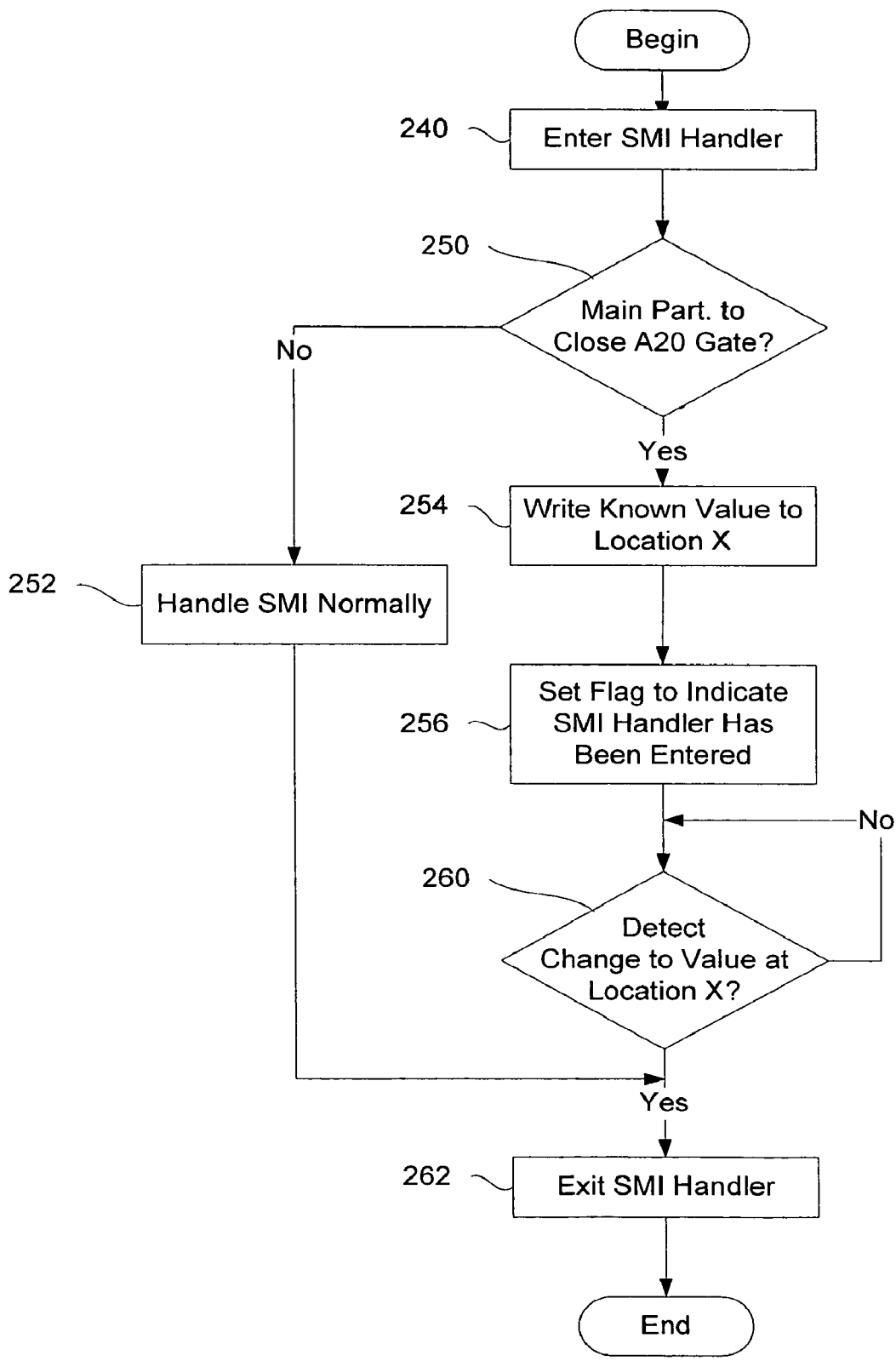

FIGS. 3 & 4 are flowcharts depicting various aspects of a process for maintaining a sequestered partition when booting a main partition, according to an example embodiment of the present invention. FIG. 3 depicts the perspective of main partition 50 during the process described above, while FIG. 4 depicts the perspective of sequestered partition 52. Accordingly, the operations depicted in FIGS. 3 and 4 generally correspond to the operations described with regard to timelines 90 and 92, respectively, in FIG. 2.

FIG. 3 starts with processing system 20 preparing to boot an OS into main partition 50. At block 202, firmware in processing system 20 determines whether main partition 50 is to boot to an OS that needs address line #21 to be disabled. Such an OS may be referred to as a legacy OS or a non-EFI-compliant OS. Moreover, for purposes of this disclosure, the term "legacy OS" refers to any OS which requires one or more address lines to be disabled before the OS's boot loader is called. If main partition 50 is to boot to an EFI-compliant OS, processing system may initiate the boot process for that OS with no special operations, as indicated at block 204. However, if main partition 50 is to boot to a legacy OS, main partition 50 may send an SMI to sequestered partition 52, as indicated at block 206.

As indicated at block 210, main partition 50 may then wait until it detects an indication that sequestered partition 52 has entered its SMI handler. After detecting that sequestered partition 52 has entered its SMI handler, main partition 50 may switch to real mode, disable address line #21, and launch the OS boot loader, as depicted at block 212 and 214 and described above. The OS boot loader may then switch to protected mode, enable address line #21, and load OS 60, as depicted at blocks 216 and 218. OS 60 may then modify location X, as indicated at block 220. The process of FIG. 3 may then end.

The process of FIG. 4 starts with firmware 44 and possibly OS 62 loaded in sequestered partition 52. As indicated at blocks 240 and 250, when sequestered partition 52 receives an SMI, SMI handler 48 determines whether the SMI is from main partition 50 indicating that the A20 gate is about to be closed. If the SMI does not indicate that main partition 50 is about to disable address line #21, the interrupt may be handled in a more or less conventional manner, as indicated at block 252.

On the other hand, if the SMI does indicate that main partition 50 is about to disable address line #21, SMI handler 48 may, in response to the SMI, write a predetermined value to location X, and may then set a flag to indicate to main partition 50 that sequestered partition 52 has entered SMI handler 48, as indicated at blocks 254 and 256 and described above. As indicated at block 260, sequestered partition 52 may then remain in SMI handler 48 until SMI handler 48 detects a change to the contents of location X. After detecting such a change, sequestered partition 52 may exit SMI handler 48, as indicated at block 262. The process of FIG. 4 may then end.

The above descriptions involve a sequestered partition that determines whether it is safe to leave the SMI handler by monitoring location X for a change. The above descriptions also involve a main partition that determines whether the sequestered partition has entered its SMI handler by reference to a flag that is set by the sequestered partition. However, any other suitable technique may be used to make such determinations in other embodiment.

For instance, various embodiments may use one or more of the following techniques for the sequestered partition to determine when it is safe to leave the SMI handler:

Monitor the state of some location in memory, in a processor, in a chipset register, in a device, etc., where the content of the location is modified after the OS switches the processor to protected mode. Once the OS has switched its processing unit to protected mode, it is safe to assume that address line #21 has been re-enabled.

A custom driver in the OS for the main partition may send a signal to the sequestered partition. For instance, the SMI handler in the sequestered processor may re-enable interrupts, may create an interrupt redirection table (IDT), and may implement an IPI handler, and the custom driver could send an IPI to the sequestered processor. Similarly, the main partition in various embodiments may use any suitable technique to determine whether the sequestered partition has entered its SMI handler.

As has been described, a processing system may maintain a sequestered partition while a main partition boots a legacy OS. Also, as indicated above, a processing system may contain more than one main partition, more than one sequestered partition, or multiple main partitions and sequestered partitions. Such a processing system may maintain one or more sequestered partitions while one or more main partitions boots a legacy OS. For purposes of this disclosure, any partition that boots to a legacy OS may be referred to as a main partition, a legacy partition, or a non-sequestered partition.

In light of the principles and example embodiments described and illustrated herein, it will be recognized that the described embodiments can be modified in arrangement and detail without departing from such principles. For instance, although SMI handlers are described above, alternative embodiments may utilize other types of interrupt or event handlers to prevent a sequestered partition from attempting to use a memory location that may be affected by a disabled address line.

Also, although the foregoing discussion has focused on particular embodiments, other configurations are contemplated as well. Even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media encoding instructions for performing the operations of the invention. Such embodiments may also be referred to as program products. Such machine-accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for maintaining a partition in a processing system, the method comprising:
   entering an interrupt handler of a first partition in a processing system;
   after the first partition enters the interrupt handler, disabling an address line of the processing system and calling an operating system (OS) boot loader for a second partition in the processing system;
   after the address line has been disabled, determining, from the first partition, whether the address line has been enabled; and
   exiting the interrupt handler of the first partition only after determining that the address line has been enabled.

2. A method according to claim 1, further comprising:
   transmitting an interrupt from the second partition to the first partition; and
   calling the OS boot loader for the second partition after transmitting the interrupt from the second partition to the first partition.

3. A method according to claim 1, further comprising:
   transmitting an interrupt from the second partition to the first partition before the second partition has called the OS boot loader; and
   entering the interrupt handler of the first partition in response to receiving the interrupt from the second partition at the first partition.

4. A method according to claim 1, further comprising:
   determining, from the second partition, whether the first partition has entered the interrupt handler; and
   calling the OS boot loader for the second partition only after determining that the first partition has entered the interrupt handler.

5. A method according to claim 1, further comprising:
   determining, from the second partition, whether the first partition has entered the interrupt handler; and
   in response to determining that the first partition has entered the interrupt handler, disabling address line #21 and transitioning a processing unit for the second partition to real mode.

6. A method according to claim 1, wherein the operation of determining, from the first partition, whether the address line has been enabled comprises:
   determining, from the first partition, whether a processing unit for the second partition has performed an operation after entering protected mode.

7. A method according to claim 1, wherein the operation of determining, from the first partition, whether the address line has been enabled comprises:
   determining, from the first partition, whether content at a predetermined location has been changed.

8. A method according to claim 1, wherein:
the second partition transmits a system management interrupt (SMI) to the first partition before the second partition has called an OS boot loader; and
the interrupt handler of the first partition comprises an SMI handler.

9. A method according to claim 1, wherein:
the first partition comprises a sequestered partition; and
the second partition comprises a non-sequestered partition.

10. An article comprising:
a non-transitory machine-accessible medium; and
instructions in the machine-accessible medium, wherein the instructions, when executed by a processing system, cause the processing system to perform operations comprising:
entering an interrupt handler of a first partition in the processing system;
after the first partition enters the interrupt handler, disabling an address line of the processing system and calling an operating system (OS) boot loader for a second partition in the processing system;
after the address line has been disabled, determining, from the first partition, whether the address line has been enabled; and
exiting the interrupt handler of the first partition only after determining that the address line has been enabled.

11. An article according to claim 10, wherein the instructions cause the processing system to perform operations comprising:
transmitting an interrupt from the second partition to the first partition; and
calling the OS boot loader for the second partition after transmitting the interrupt from the second partition to the first partition.

12. An article according to claim 10, wherein the instructions cause the processing system to perform operations comprising:
determining, from the second partition, whether the first partition has entered the interrupt handler; and
calling the OS boot loader for the second partition only after determining that the first partition has entered the interrupt handler.

13. An article according to claim 10, wherein the operation of determining, from the first partition, whether the address line has been enabled comprises:
determining, from the first partition, whether content at a predetermined location has been changed.

14. An article comprising:
a non-transitory machine-accessible medium; and
instructions in the machine-accessible medium, wherein the instructions comprise firmware which, when executed by a first partition in a processing system, cause the first partition to perform operations comprising:
transmitting an interrupt to a second partition in the processing system; and
disabling an address line of the processing system and calling an OS boot loader for the first partition only after transmitting the interrupt to the second partition.

15. An article according to claim 14, wherein the instructions, when executed by the first partition, perform operations comprising:
enabling the address line; and
after enabling the address line, modifying data at a predetermined location, the modified data to indicate that the first partition has enabled the address line.

16. An article according to claim 14, wherein the instructions, when executed by the first partition, perform operations comprising:
determining whether the second partition has entered the interrupt handler; and
calling the OS boot loader for the first partition only after determining that the second partition has entered the interrupt handler.

17. An article according to claim 14, wherein the instructions, when executed by the first partition, perform operations comprising:
determining whether the second partition has entered the interrupt handler; and
in response to determining that the second partition has entered the interrupt handler, disabling address line #21 and transitioning a processing unit for the first partition to real mode.

* * * * *